United States Patent
Shetty et al.

(10) Patent No.: US 8,060,760 B2
(45) Date of Patent: Nov. 15, 2011

(54) SYSTEM AND METHOD FOR DYNAMIC INFORMATION HANDLING SYSTEM PRIORITIZATION

(75) Inventors: Sudhir Shetty, Cedar Park, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 827 days.

(21) Appl. No.: 11/777,528

(22) Filed: Jul. 13, 2007

(65) Prior Publication Data

US 2009/0019202 A1    Jan. 15, 2009

(51) Int. Cl.
   *G06F 1/26*    (2006.01)
(52) U.S. Cl. .......................... 713/300; 713/310
(58) Field of Classification Search .......... 713/300–340
   See application file for complete search history.

(56) References Cited

U.S. PATENT DOCUMENTS

| | | | |
|---|---|---|---|
| 5,953,536 A * | 9/1999 | Nowlin, Jr. | 713/323 |
| 7,032,037 B2 | 4/2006 | Garnett et al. | 710/2 |
| 2006/0036878 A1 * | 2/2006 | Rothman et al. | 713/300 |
| 2006/0082222 A1 * | 4/2006 | Pincu et al. | 307/29 |
| 2006/0161794 A1 * | 7/2006 | Chiasson et al. | 713/300 |
| 2007/0180280 A1 * | 8/2007 | Bolan et al. | 713/300 |
| 2007/0250838 A1 * | 10/2007 | Belady et al. | 718/105 |
| 2008/0010521 A1 * | 1/2008 | Goodrum et al. | 714/22 |
| 2008/0104430 A1 * | 5/2008 | Malone et al. | 713/300 |
| 2008/0178019 A1 * | 7/2008 | McGrane et al. | 713/320 |

* cited by examiner

*Primary Examiner* — Dennis M Butler
(74) *Attorney, Agent, or Firm* — Hamilton & Terrile, LLP; Robert W. Holland

(57) ABSTRACT

Modular information handling systems supported in a modular chassis, such as blade information handling systems, have power allocation managed by dynamic and automated prioritization of power application to each modular information handling systems. A priority list of modular information handling systems is generated and updated by analysis of priority factors discovered from the modular information handling systems, such as with periodic polling of the modular information handling systems or detection of predetermined events at the information handling systems.

19 Claims, 2 Drawing Sheets

SYSTEM AND METHOD FOR DYNAMIC INFORMATION HANDLING SYSTEM PRIORITIZATION

BACKGROUND OF THE INVENTION

1. Field of the Invention

The present invention relates in general to the field of information handling system power management, and more particularly to a system and method for dynamic information handling system prioritization.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often placed in a common location to ensure an adequate power supply and cooling. For example, plural information handling systems sometimes share one or more "racks" placed in a data center so that the systems take up a reduced amount of space. In modular chassis systems, plural information handling systems share a common chassis under the control of a chassis management controller (CMC) that, for instance, manages the power budget of the chassis. One example of a modular chassis system is a blade system that has a blade chassis populated by plural blade information handling systems which typically share a common power supply and cooling system. CMC firmware manages the sharing of blade chassis resources, such as by making blade power allocation decisions, throttling blade information handling systems installed in a chassis and responding to system events like power supply unit failure. Typically, the CMC firmware algorithm that makes resource allocation decisions relies upon a priority rating associated with each blade information handling system. For example, a higher priority might be assigned to a blade information handling system that supports an e-mail exchange server than one that supports information storage in a database. With such a priority example, if a power need arises, the CMC firmware throttles the blade information handling system that supports the database before throttling the blade information handling system that supports e-mail. Such power needs might arise where a chassis power supply is lost or removed or where an additional blade information handling system powers on.

One advantage of modular chassis systems is that they are scalable, meaning that information handling system modules may be added to a modular chassis as information processing needs increase. One example of a tool that helps to scale information handling system resources is the use of virtual machines. Virtual machines run as separately identifiable information handling systems on top of an operating system and physical information handling system. For example, a single blade information handling system might support operation of multiple virtual machines, each of which are managed as individual information handling systems. As various virtual machines are activated and deactivated, physical resources of various blade information handling systems within a modular blade chassis are used to support operation of the virtual machines. Dynamic provisioning of virtual machines helps to ensure that resources of a modular chassis system are efficiently used. Further, migration of virtual machines, such as with VMotion, allows flexible assignment of virtual machines to blade information handling systems to adapt as blade information handling systems are added to a chassis.

SUMMARY OF THE INVENTION

Therefore a need has arisen for a system and method which dynamically adjusts information handling system prioritization based on discovery of functions associated with information handling systems.

In accordance with the present invention, a system and method are provided which substantially reduce the disadvantages and problems associated with previous methods and systems for establishing information handling system prioritization. Priority factors are automatically discovered from information handling systems and applied to dynamically determine a priority for power allocation between the information handling systems.

More specifically, a modular chassis supports plural modular information handling systems, such as blade information handling systems. Power from a power system of the modular chassis is allocated to modular information handling systems with a chassis manager according to a priority list generated by a priority manager. A discovery engine periodically polls the modular information handling system to discover priority factors and an event management engine monitors operation of the modular information handling systems to detect predetermined events associated with changes in the priority factors. A prioritization engine applies the priority factors to rules to determine the priority list. The priority rules and associated weights are selectively set by an end user through a priority rule interface.

The present invention provides a number of important technical advantages. One example of an important technical advantage is that information handling system prioritization dynamically adjusts based on discovery of functions associated with information handling systems. For example, blade CMC firmware manages the power budget of a blade chassis by re-prioritizing blade information handling systems as functions supported by the blade information handling systems change. For instance, re-provisioning of a virtual machine from a first to a second information handling system automatically results dynamic re-prioritization of the first and second information handling systems based on the priority of the virtual machine. CMC firmware is thus able to implement power allocation strategies based upon dynamic characteristics of an enterprise deployment rather than relying on potentially outdated or otherwise irrelevant static priority schemes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Dynamic prioritization of power allocation between modular information handling systems helps to ensure that priority functions remain operative even where the priority functions shift between modular information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
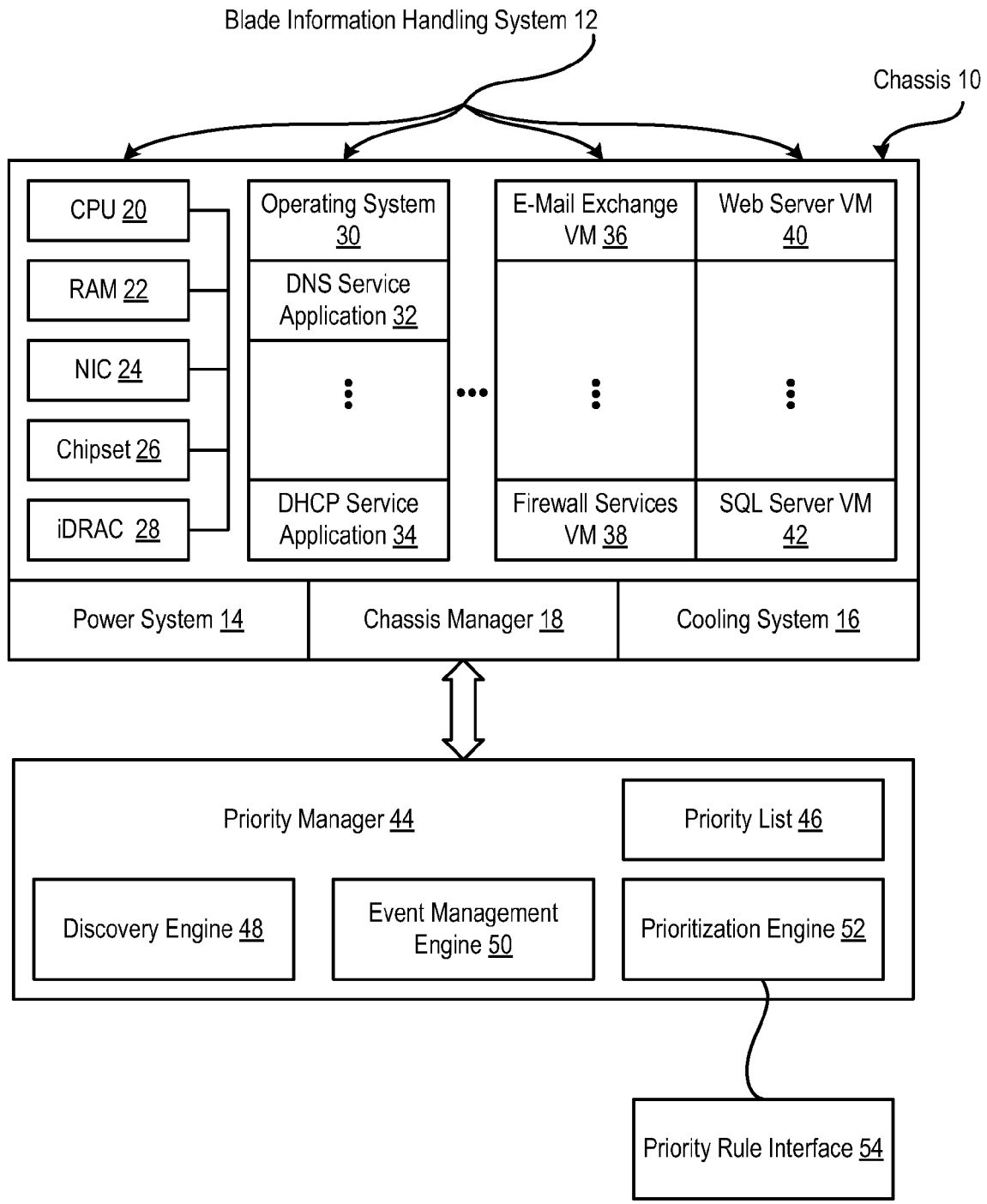
FIG. 1 depicts a block diagram of a modular information handling system chassis having dynamic power allocation based on analysis of priority factors discovered from modular information handling systems.

Referring now to FIG. 1, a block diagram depicts a modular information handling system chassis 10 having dynamic power allocation based on analysis of priority factors discovered from plural modular information handling systems 12. In the example depicted by FIG. 1, the modular systems are blade information handling systems that have a common power system 14 and common cooling system 16 disposed in chassis 10 under the control of a chassis manager 18, such as a chassis management controller (CMC). Each modular information handling system 12 has plural processing components to process information, such as a CPU 20, RAM 22, a network interface card (NIC) 24, a chipset 26 and a integrated Dell Remote Access Controller (iDRAC) 28. Some of the modular information handling systems 12 support specific functions, such as with an operating system 30 that runs applications loaded onto each system at start-up, like a DNS service application 32 or a DHCP service application 34. Other of the modular information handling systems 12 support functions that vary by loading and running virtual machines for each function, such as an e-mail exchange virtual machine 36, a firewall services virtual machine 38, a web server virtual machine 40 and an SQL server virtual machine 42. Each virtual machine presents itself to a network as a physical information handling system by running its own operating system over the operating system 30 of a physical system 12. Plural virtual machines may run on a given physical system 12 any may migrate between physical systems 12.

Chassis manager 18 allocates power to modular information handling systems 12 to the extent that power system 14 is capable of providing power. The user can configure the chassis manager 18 to enable throttling of the modular information handling system 12, in the event of power consumption exceeding the input power warning threshold. Once power system 14 reaches a warning threshold level of power consumption, chassis manager 18 reduces the power allocated to one or more modular information handling systems 12. For example, if insufficient power is available to operate all of the modular information handling systems 12 found in chassis 10, chassis manager 18 enforces power savings features at one or more systems 12 by throttling CPUs 20 or shutting down entire systems 12. Chassis manager 18 may perform similar reductions of power if cooling system 16 has reached its maximum capacity. For example, chassis manager 18 throttles CPUs 20 or shuts down entire systems 12 to avoid an overheat condition within chassis 10. In either case, chassis manager 18 allocates power between modular information handling systems 12 based on power allocation determinations of a priority manager 44, which automatically compares priority factors associated with each modular information handling system 12 to dynamically create a priority list 46. Priority list 46 weighs the relative importance of the functions currently performed by each physical modular information handling system 12 so that the more important of those functions remain available for as long as possible as chassis manager 18 progressively enforces power savings features, such as throttling CPUs or shutting down systems 12.

Priority manager 44 generates priority list 46 by automatically discovering information about each modular information handling system 12 to define a profile for each system 12 and then comparing the profiles to determine an ordered list for prioritized power allocation. For example, a discovery engine periodically polls each modular information handling system 12 on a scheduled basis through system management interfaces to discover and inventory defined attributes of each system that are associated with power allocation priority factors. The polled attributes are stored and compared to identify changes to the priority factors over time, such as when a module is added to or removed from chassis 10. As an example, discovery engine 48 polls for information about services provided by each system 12, processes run by each system 12 and server roles provided by each system 12. For instance, such polling might help to identify modular information handling systems 12 that are providing e-mail service versus database service, each of which might have a different priority to an end user of the systems. As another example, discovery engine 48 polls modular information handling systems 12 to identify the processor, memory, FRU or other hardware attributes of each system 12, such as to identify the power usage attributes associated with each system 12. As another example, discovery engine 48 polls each modular information handling system 12 to identify the virtual machines and virtual machine attributes associated with each physical system 12, such as the number of virtual machines running on each system 12, the guest operating system for each virtual machine and the configuration of each virtual machine. In addition to scheduled polling provided by discovery engine 48, an event management engine 50 monitors asynchronous events associated with each system 12 to detect real time changes to the priority factors. For example, virtual machine migrations and operating system startups are monitored so that changes in the virtual machines running on each modular information handling system 12 are detected on a real time basis. For instance, real time detection of virtual machine operation allows association of priority factors with the functions provided by each virtual machine.

As priority factors are automatically updated, a prioritization engine 52 dynamically applies the priority factors to generate priority list 46. For example, prioritization engine 52 is a plug-in application running on an information handling system, such as a management station, that has rules to dynamically compute new priorities for modular information handling systems 12 as changes in the priority factors are detected by discovery engine 48 or event management engine 50. For instance, each attribute inventoried by discovery engine 48 or event management engine 50 is associated with a rule that is tied to an SQL query so that an end-user may define rules through a priority rule interface 54. In addition, rules may have weights associated with them so that, after application of the rules and weights, the highest weight is given the greatest priority. The relative list of priorities in priority list 46 enables chassis manager 18 to implement power allocation strategies based on the dynamic characteristics of an enterprise deployment rather than relying on a static list of priorities from an outdated or irrelevant priority scheme.

Figure 2:
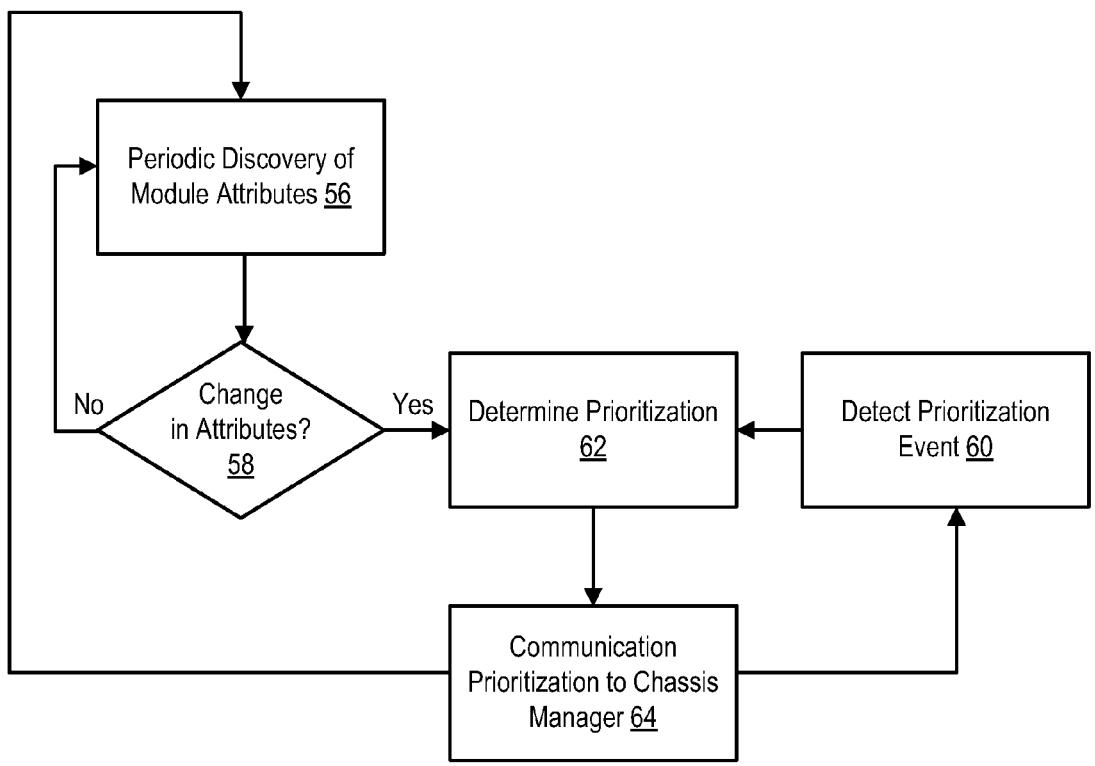
FIG. 2 depicts a flow diagram of a process for dynamic power allocation between modular information handling systems based on analysis of priority factors discovered from the modular information handling systems.

Referring now to FIG. 2, a flow diagram depicts a process for dynamic power allocation between modular information handling systems based on analysis of priority factors discovered from the modular information handling systems. The process begins at step 56 with periodic discovery of information handling system module attributes, such as by scheduled polling of each information handling system module. If, at step 58, no change is detected in the attributes of the polled information handling systems, then the process returns to step 56 for the next scheduled poll. If a changed attribute is detected, then the process continues to step 62 for a determination of a priority list for the information handling systems. At step 60, operations of the information handling systems are monitored to detect predetermined prioritization events, such as migration of a virtual machine between physical systems. If a prioritization event is detected, the process continues to step 62 to determine the prioritization of the physical systems in response to the detected event. At step 62, the attributes of the physical systems that represent priority factors are applied to predetermined rules and weights to determine a priority list. As an example, a rule might give higher priority to e-mail functions than to database functions. Once the priority list is determined, then at step 64, the priority list is communicated to a chassis manager for application at the chassis so that, for instance, during allocation of power between physical systems, the physical systems currently supporting lower-priority functions are throttled or shut down. Once the priority list is applied at the chassis manager, the process returns to steps 56 and 60 to periodically poll information handling system modules and to detect prioritization events.

Although the present invention has been described in detail, it should be understood that various changes, substitutions and alterations can be made hereto without departing from the spirit and scope of the invention as defined by the appended claims.

What is claimed is:

1. A modular chassis information handling system comprising:
    a chassis having plural slots, each slot operable to accept an information handling system module;
    a power system operable to provide power to each slot for powering the information handling system modules;
    a chassis manager interfaced with the power system and operable to selectively allocate power to the information handling system modules according to a priority; and
    a priority manager interfaced with the chassis manager and the information handling system modules, the priority manager operable to automatically analyze one or more priority factors retrieved from each of the information handling system modules to determine the priority, the priority factors comprising at least attributes of one or more virtual machines currently running on the information handling system modules.

2. The modular chassis information handling system of claim 1 wherein the priority manager comprises a discovery engine operable to periodically discover the one or more priority factors from the information handling system modules.

3. The modular chassis information handling system of claim 1 wherein the priority manager comprises an event management engine operable to detect a priority event associated with an information handling system module, the priority event associated with a change to the one or more priority factors.

4. The modular chassis information handling system of claim 3 wherein the priority event comprises a virtual machine migration.

5. The modular chassis information handling system of claim 3 wherein the priority event comprises an operating system startup.

6. The modular chassis information handling system of claim 1 wherein the priority manager comprises a prioritization engine operable having rules to determine the priority from the priority factors.

7. The modular chassis information handling system of claim 6 further comprising a priority rules interface operable to accept end user definitions of the rules.

8. The modular chassis information handling system of claim 1 wherein the information handling system modules comprise information handling system blades.

9. A method for allocating power between modular information handling systems of a modular information handling system chassis, the method comprising:
    analyzing one or more priority factors to determine a priority between the modular information handling systems, the priority factors comprising at least information about virtual machines currently running on one or more of the modular information handling system;
    applying the priority to allocate power between the modular information handling systems;
    automatically monitoring the modular information handling systems to detect changes in the priority factors; and
    dynamically analyzing detected changes in the priority factors to update the priority.

10. The method of claim 9 wherein the modular information handling systems comprise blade information handling systems.

11. The method of claim 9 wherein automatically monitoring the modular information handling systems further comprises periodically discovering the priority factors by polling the modular information handling systems.

12. The method of claim 11 wherein periodically discovering the priority factors further comprises polling the modular information handling systems for energy consumption characteristics.

13. The method of claim 11 wherein periodically discovering the priority factors further comprises polling the modular information handling systems through system management interfaces for information about services provided by each system.

14. The method of claim 11 wherein periodically discovering the priority factors further comprises polling the modular information handling systems to determine virtual machines associated with each system.

15. The method of claim 9 wherein automatically monitoring the modular information handling systems further comprises monitoring the modular information handling systems for one or more virtual machine startup events.

16. The method of claim 15 wherein automatically monitoring the modular information handling systems further comprises monitoring the modular information handling systems for virtual machine migration events.

17. A system for managing allocation of power between plural information handling systems, the system comprising:
one or more power supplies interfaced with the plural information handling systems and operable to provide power to the information handling systems;
a manager interfaced with the power supplies and the information handling systems, the manager operable to allocate power provided by the power supply to the information handling systems; and
a priority manager interfaced with the manager and the power supplies, the priority manager operable to automatically analyze information about virtual machines running on the information handling systems and retrieved from the information handling systems to determine a priority for the manager to allocate power between the information handling systems; and
an event management engine operable to detect a virtual machine migration event associated with the information handling systems and to provide migration information to the priority manager to adjust the priority based upon functions provided by a virtual machine associated with the virtual machine migration event.

18. The system of claim 17 wherein the priority manager further comprises a discovery engine operable to periodically monitor the plural information handling systems to detect priority factors, the priority manager applying the priority factors to determine the priority.

19. The system of claim 17 wherein the priority manager further comprises a prioritization engine operable to provide rules to priority factors automatically discovered from the information handling systems to determine the priority, the priority factors comprising functions performed by the virtual machines.

* * * * *